US009787409B1

(12) United States Patent
Ladd (10) Patent No.: US 9,787,409 B1
(45) Date of Patent: Oct. 10, 2017

(54) HIGH-SPEED OPTICAL QUANTUM COMMUNICATION SYSTEM BASED ON MODE-LOCKED LASER PULSES

(71) Applicant: HRL LABORATORIES, LLC, Malibu, CA (US)

(72) Inventor: Thaddeus D. Ladd, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/143,418

(22) Filed: Apr. 29, 2016

Related U.S. Application Data (60) Provisional application No. 62/155,386, filed on Apr. 30, 2015.

(51) Int. Cl.

| H04B 10/00 | (2013.01) |
|---|---|
| H04B 10/70 | (2013.01) |
| H04B 10/11 | (2013.01) |
| H04J 14/02 | (2006.01) |
| H04B 10/50 | (2013.01) |
| H04B 10/508 | (2013.01) |
| H04J 14/00 | (2006.01) |

(52) U.S. Cl.
CPC ............. *H04B 10/70* (2013.01); *H04B 10/11* (2013.01); *H04B 10/503* (2013.01); *H04B 10/508* (2013.01); *H04J 14/02* (2013.01)

(58) Field of Classification Search
CPC .......... H04B 10/30; H04B 10/70; H04B 10/85
See application file for complete search history.

(56) References Cited

U.S. PATENT DOCUMENTS

| 2008/0144823 | A1* | 6/2008 | Abe | ........................ | H04B 10/70 380/256 |
|---|---|---|---|---|---|
| 2015/0016610 | A1* | 1/2015 | Verma | ................... | H04L 9/0858 380/256 |

OTHER PUBLICATIONS

Boivin et al., "110 Channels×2.35 Gb/s from a Single Femtosecond Laser," IEEE Photonics Technology Letters, 11(4):466-468, Apr. 1999.

(Continued)

*Primary Examiner* — Daniel Dobson
(74) *Attorney, Agent, or Firm* — Lewis Roca Rothgerber Christie, LLP (57) ABSTRACT

A multi-channel free-space optical wavelength division multiplexing system for optical quantum communication includes a transmitter configured to encode an input signal into a weak optical signal carrying quantum information, and to transmit the weak optical signal over a plurality of frequency channels in free space, each of the plurality of frequency channels corresponding to a plurality of photons of the weak optical signal, and a receiver configured to receive and decode the weak optical signal.

20 Claims, 2 Drawing Sheets

(56) References Cited

OTHER PUBLICATIONS

Choi et al., "Quantum key distribution on a 10Gb/s WDM-PON," Optics Express, 18(9):9600-9612, Apr. 26, 2010.
Mielke et al., "168 Channels×6 GHz From a Multiwavelength Mode-Locked Semiconductor Laser," IEEE Photonics Technology Letters, 15(4):501-503, Apr. 2003.
Mora et al., "Simultaneous transmission of 20×2 WDM/SCM-QKD and 4 bidirectional classical channels over a PON," Optics Express, 20(15):16358-16365, Jul. 16, 2012.
Mower et al.,"Dense Wavelength Division Multiplexed Quantum Key Distribution Using Entangles Photons," arXiv:1110.4867v1, Oct. 21, 2011, 9 pages.
Wang et al., "Running-code optical CDMA at 2×10 Gbit/s and 40 Gbit/s," Electronics Letters, 46(10), 2 pages, May 13, 2010.

\* cited by examiner

HIGH-SPEED OPTICAL QUANTUM COMMUNICATION SYSTEM BASED ON MODE-LOCKED LASER PULSES

CROSS-REFERENCE TO RELATED APPLICATION(S)

This application claims priority to, and the benefit of, U.S. Patent Application No. 62/155,386 ("High-speed Optical Quantum Communication System based on Mode-locked Laser Pulses"), filed on Apr. 30, 2015, the entire content of which is incorporated herein by reference.

FIELD

Aspects of the invention relate to the field of quantum optical communication systems and methods of using the same.

BACKGROUND

Generally, quantum key distribution (QKD) systems are employed for applications that require higher levels of cryptographic security than available from more standard cryptographic systems, such as when it's desired to secure communicated data against analysis from possible computational advances in the future. As such, QKD systems are of interest to information security for government, banking, and other markets. However, the current market for QKD systems is limited by the small range or low speed in single-channel commercial products.

Additionally, free-space quantum communication has had limited application, as transmission lengths in the atmosphere are much smaller than in silica fiber at telecommunication wavelengths. Due in part to the fact that the speed of secure quantum communication in free space drops significantly with distance, free-space quantum communication systems have garnered little attention to date.

The above information disclosed in this Background section is only for enhancement of understanding of the background of the invention, and therefore it may contain information that does not form the prior art.

SUMMARY

Aspects of embodiments of the present invention are directed toward a system for a high-speed quantum optical communication system, and a method of using the same for establishing quantum communication. According to some embodiments, the quantum optical communication system enables the implementation of quantum key distribution (QKD) or similar protocols by generating weak (e.g., attenuated) optical signals on multiple frequency channels, transmitting the optical signals over free space, and receiving the further weakened (e.g., further attenuated) optical signals so that only single photons are detectable.

According to some exemplary embodiments of the present invention, there is provided a multi-channel free-space optical (FSO) wavelength division multiplexing (WDM) system for optical quantum communication, the system including: a transmitter configured to encode an input signal into a weak optical signal carrying quantum information, and to transmit the weak optical signal over a plurality of frequency channels in free space, each of the plurality of frequency channels corresponding to a plurality of photons of the weak optical signal; and a receiver configured to receive and decode the weak optical signal.

In an embodiment, the weak optical signal carries the quantum information over the plurality of frequency channels, and the receiver is configured to convert the received weak optical signal into an output signal, each of the plurality of frequency channels corresponding to, on average, less than one photon of the weak optical signal at an output of the transmitter, and a smaller number of photons of the received weak optical signal at an input of the receiver.

In an embodiment, the transmitter is configured to generate the weak optical signal using a single laser source.

In an embodiment, the input signal is a quantum key or an encoded data signal embedded with the quantum key, and the plurality of frequency channels represent a plurality of parallel quantum channels.

In an embodiment, the transmitter is configured to encode the input signal in a phase of the weak optical signal.

In an embodiment, there is no physical connection between the transmitter and the receiver.

According to some exemplary embodiments of the present invention, there is provided a transmitter for a multi-channel FSO WDM system including: a laser source configured to generate a plurality of mode-locked broadband laser pulses separated in time; a first passive spatially dispersive element configured to spatially disperse the plurality of mode-locked broadband laser pulses into a plurality of dispersed pulses; a dispersive spatial light modulator configured to modulate the plurality of dispersed pulses using an input signal to generate a plurality of dispersed modulated pulses using a modulation scheme; an attenuator configured to attenuate the plurality of dispersed modulated pulses to generate a plurality of dispersed attenuated pulses; and a second passive spatially dispersive element configured to spectrally combine the plurality of dispersed attenuated pulses to generate a weak optical signal transmitted through free space over a plurality of frequency channels.

In an embodiment, the weak optical signal carries quantum information, and the transmitter is configured to transmit the weak optical signal over a plurality of frequency channels in free space to a receiver configured to receive and decode the weak optical signal, and the receiver is configured to convert the received weak optical signal into an output signal, each of the plurality of frequency channels corresponding to, on average, less than one photon of the weak optical signal at an output of the transmitter, and a smaller number of photons of the received weak optical signal at an input of the receiver.

In an embodiment, the laser source is a mode-locked laser based on a semiconductor heterostructure with saturable absorber, a fiber system, or a solid-state crystal and an acousto-optic modulator.

In an embodiment, each of the first and second passive spatially dispersive elements include a holographic grating, a ruled grating, or a prism, and the second passive spatially dispersive element is an inverse of the first passive spatially dispersive element.

In an embodiment, the modulation scheme includes a phase modulation scheme or an amplitude modulation scheme.

According to some exemplary embodiments of the present invention, there is provided a receiver for a multi-channel FSO WDM system including: an unbalanced mach-zender interferometer configured to receive a weak optical signal and to generate a combined beam including time and/or amplitude encoded information corresponding to phase-encoded information within the weak optical signal; a passive spatially dispersive element configured to spatially disperse the combined beam into a plurality of time and/or amplitude encoded dispersed pulses; and a detector array configured to convert the plurality of time and/or amplitude encoded dispersed pulses into an output signal, the output signal being an electronic signal.

In an embodiment, the unbalanced mach-zender interferometer includes: an input coupler configured to split the weak optical signal into a first portion passing through a first arm and a second portion passing through a second arm, the second arm having a longer length than the first arm; a broadband mirror configured to delay the second portion relative to the first portion; and an output coupler configured to combine the first and second portions to generate the combined beam.

In an embodiment, the detector array includes avalanche photodiodes, an intensified charge-coupled device, or an array of superconducting nanowire detectors.

In an embodiment, the receiver is configured to receive the weak optical signal from a transmitter over a plurality of frequency channels in free space, the transmitter being configured to encode an input signal representing quantum information into the weak optical signal, and each of the plurality of frequency channels corresponds to, on average, less than one photon of the weak optical signal at an output of the transmitter, and a smaller number of photons of the received weak optical signal at an input of the receiver In an embodiment, the receiver is configured to resolve a relative phase of photon pulses over the plurality of frequency channels.

According to some exemplary embodiments of the present invention, there is provided a method for enabling quantum communication in a multi-channel free-space (FSO) wavelength division multiplexing (WDM) system, the method including: encoding, via a transmitter, an input signal into a first weak optical signal carrying quantum information; transmitting, via the transmitter, the first weak optical signal over a plurality of frequency channels in free space, each of the plurality of frequency channels corresponding to a plurality of photons of the first weak optical signal; receiving, via a receiver, a second weak optical signal corresponding to the first weak optical signal and carrying the quantum information over the plurality of frequency channels in free space; and converting, via the receiver, the second weak optical signal into an output signal, each of the plurality of frequency channels corresponding to, on average, less than one photon of the first weak optical signal, and a smaller number of photons of the second weak optical signal.

In an embodiment, the receiving and converting include: generating, via a laser source, a plurality of mode-locked broadband laser pulses separated in time; spatially dispersing, via a first passive spatially dispersive element, the plurality of mode-locked broadband laser pulses into a plurality of dispersed pulses; modulating, via a dispersive spatial light modulator, the plurality of dispersed pulses using the input signal to generate a plurality of dispersed modulated pulses using a modulation scheme; attenuating, via an attenuator, the plurality of dispersed modulated pulses to generate a plurality of dispersed attenuated pulses; and spectrally combining, via a second passive spatially dispersive element, the plurality of dispersed attenuated pulses to generate the first weak optical signal transmitted through free space over the plurality of frequency channels.

In an embodiment, the receiving and converting include: receiving, via an unbalanced mach-zender interferometer, the second weak optical signal; generating, via an unbalanced mach-zender interferometer, a combined beam including time and/or amplitude encoded information corresponding to phase-encoded information within the second weak optical signal; spatially dispersing, via a third passive spatially dispersive element, the combined beam into a plurality of time and/or amplitude encoded dispersed pulses; and converting, via a detector array, the plurality of time and/or amplitude encoded dispersed pulses into the output signal, the output signal being an electronic signal.

In an embodiment, the input signal is a quantum key or an encoded data signal embedded with the quantum key.

BRIEF DESCRIPTION OF THE DRAWINGS

The above and other features and aspects of the invention will be made more apparent by the following detailed description of exemplary embodiments thereof with reference to the attached drawings, in which.

DETAILED DESCRIPTION

The attached drawings for illustrating exemplary embodiments of the invention are referred to in order to provide a sufficient understanding of the invention, the merits thereof, and the objectives accomplished by the implementation of the invention. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art.

Hereinafter, the invention will be described in detail by explaining exemplary embodiments of the invention with reference to the attached drawings. In the drawings, like reference numerals are used throughout the figures to reference like features and components.

According to some embodiments of the present invention, a high-speed quantum optical communication system generates, transmits, and receives weak optical signals so that, with high probability, only single photons are detectable.

In some embodiments, a train of pulses from a single laser source, such as a mode-locked laser, is spatially dispersed using a spatially dispersive passive element. The spatially dispersed pulses are sent to a high-speed spatial light modulator, which then modulates the dispersed pulses using to an input signal, such as a quantum key. The modulated pulses are then attenuated and spectrally recombined (e.g., using the inverse of the spatial dispersive passive element) and transmitted over free space to a receiver.

The receiver then utilizes an interferometer (e.g., an unbalanced Mach-Zender interferometer), a spatially dispersive passive element, and a high-speed single-photon detector array to resolve the relative phase of photon pulses on multiple frequency channels.

Accordingly, embodiments of the present invention use a single laser source generating a train of laser pulses to establish parallel quantum channels across multiple frequency bands. As such, communications based on quantum key distribution (QKD) protocols (e.g., differential-Phase-based QKD) or the like may be implemented on these parallel channels. As the high-speed quantum optical communication system, according to some embodiments of the present invention, utilizes free space as a transmission medium, the system may be utilized in any application in which there is no physical connection between the transmitter and receiver, such as communication between two mobile vehicles/vessels (e.g., a tank, ship, airplane, unmanned aerial vehicle, satellite, and/or the like) or between a vehicle/vessel and a stationary base.

Figure 1:
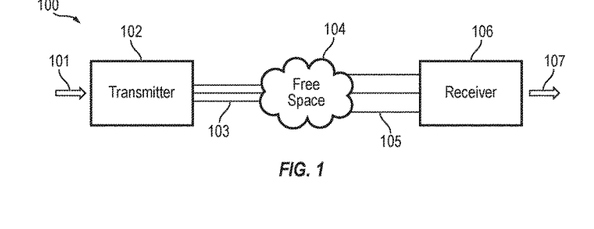
FIG. 1 is a block diagram of a multi-channel free-space optical (FSO) wavelength division multiplexing (WDM) system for quantum communication, according to some exemplary embodiments of the present invention.
Figure 2:
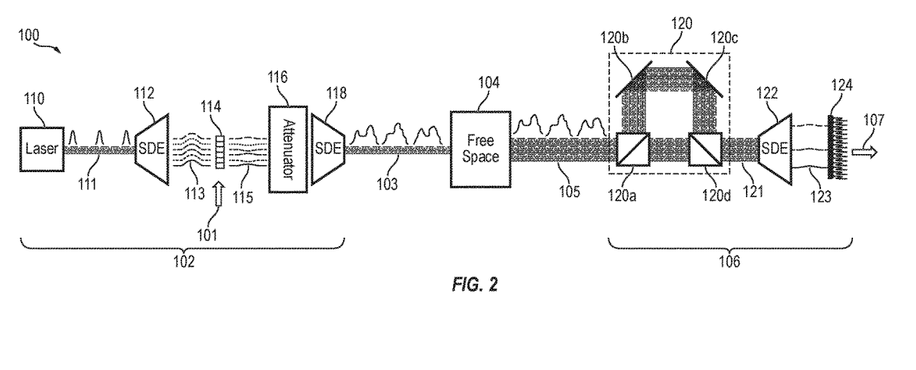
FIG. 2 is a detailed block diagram illustrating the operation of the multi-channel FSO WDM system for quantum communication, according to some exemplary embodiments of the present invention.

FIG. 1 is a block diagram of a multi-channel free-space optical (FSO) wavelength division multiplexing (WDM) system 100 for quantum communication, according to some exemplary embodiments of the present invention. FIG. 2 is a detailed block diagram illustrating the operation of the multi-channel FSO WDM system 100 for quantum communication, according to some exemplary embodiments of the present invention.

Referring to FIG. 1, the multi-channel FSO WDM system (e.g., the high-speed optical quantum communication system) 100 generates, transmits, and receives weak optical signals so that, with high probability, only single photons are detectable by a detector array. The multi-channel FSO WDM system 100 may be used for quantum key distribution (QKD) or other suitable protocols. As the rate of communication, that is, the rate of quantum information transfer, is limited by optical loss for single photons, the multi-channel FSO WDM system 100 increases the rate of communication by employing multiple frequency channels featured in a broadband optical pulse from a single mode-locked laser. In some examples, the multi-channel FSO WDM system 100 may achieve data rates on the order of several GHz. Higher data rates become desirable when the multi-channel FSO WDM system 100 distributes not only a quantum key, but also the data that is encoded with the quantum key.

The multi-channel FSO WDM system 100 includes a transmitter (e.g., a quantum optical transmitter) 102 configured to convert an input signal 101 to a first weak (e.g., attenuated) optical signal 103 and to transmit the first weak optical signal 103 over a plurality of frequency channels (e.g., a plurality of parallel quantum channels) through free space (e.g., the earth's atmosphere or the vacuum of space) 104. The input signal may be a quantum key, or may be an encoded data signal that is embedded with a quantum key for decoding the data signal by an intended recipient, that is, the receiver 106.

The multi-channel FSO WDM system 100 further includes a receiver (e.g., an optical receiver) 106 configured to receive a second weak (e.g., attenuated) optical signal 105 over the plurality of frequency channels in free space 104 and to convert the second weak optical signal 105 into an output signal 107. The output signal 107 may be the quantum key or the encoded data signal that is embedded with the quantum key.

According to some embodiments, each of the frequency channels at the side of the transmitter 102 may correspond to (e.g., carry) an average of less than 1 photon of the first weak optical signal 103. However, due to free-space loss, a portion of (e.g., more than 90% of) the emitted photons may be lost, such that each of the frequency channels at the side of the receiver 106 may correspond to an average of 0.1 photons or less. The low number of photons per channel at the transmitter 102 make the multi-channel FSO WDM system 100 suitable for quantum communication applications, such as quantum key distribution. As the rate of quantum information transfer in each quantum channel may be limited by optical loss for single photons, the transmitter 102 effectively increases the rate of communication by utilizing multiple parallel quantum channels (i.e., frequency channels).

Referring to FIG. 2, the transmitter 102 includes a laser source (e.g., a mode-locked laser) 110 configured to generate a plurality of (e.g., a train of) mode-locked broadband laser pulses 111 that are separated in time (and, e.g., appear at regular time intervals); a first passive spatially dispersive element (SDE) 112 configured to spatially disperse the plurality of mode-locked broadband pulses 111 into a plurality of dispersed pulses 113; a high-speed dispersive spatial light modulator 114 configured to modulate the plurality of dispersed pulses 113 according to the input signal 101 to generate a plurality of dispersed modulated pulses 115; an attenuator 116 configured to attenuate the plurality of dispersed modulated pulses 115 to generate a plurality of dispersed attenuated pulses; and a second passive SDE 118 configured to spectrally recombine the plurality of dispersed attenuated pulses to generate shaped pulses (i.e., the first weak optical signal) 103 transmitted through free space 104 over the plurality of frequency channels.

In some embodiments, the laser source 110 is a broadband mode-locked laser based on a semiconductor heterostructure with saturable absorber, which exhibits high speed and is suitable for device integration. In some examples, the laser source 100 has a pulse rate of about 50 MHz to about 10 GHz (e.g., a 100 MHz). In some examples, the laser source 110 may generate ultrashort laser pulses having a time duration on the order of a few nano seconds. However, embodiments of the present invention are not limited thereto, and the laser source 110 may be a mode-locked laser based on a fiber system, a solid-state crystal and an acousto-optic modulator (AOM), and/or the like. In some examples, the laser source 110 may function as a system clock by generating a mode-locked broadband pulse at regular time intervals (e.g., at a frequency of about 100 MHz). In some examples, the center wavelength of the laser pulses output from the laser source 110 may be about 850 nm; however, embodiments of the present invention are not limited thereto, and any suitable operating wavelength/frequency may be used.

The first SDE 112 splits each pulse of the plurality of mode-locked broadband pulses 111 into a number of spatially distributed beams 113 according to the wavelengths present in the pulse, where the beams represent the plurality of frequency channels. In some examples, the first SDE 112 may divide the spectrum of the train of mode-locked broadband pulses 111 into hundreds or thousands of parallel frequency channels that may be individually modulated by the spatial light modulator 114. While increasing the number of channels may improve (e.g., increase) the data transfer rate of the multi-channel FSO WDM system 100, it may also make the system 100 more susceptible to security threats (such as eavesdropping). Thus, it is desirable to balance data rate and system security when selecting the number of parallel frequency channels. In some examples, the multi-channel FSO WDM system 100 may have about 1000 channels.

The second SDE 118 performs the reverse function of the first SDE 112 by spatially compressing the plurality of dispersed modulated pulses 115. In some examples, each of the first and second SDEs 112 and 118 may be a holographic grating, which is desirable for its high spectral efficiency.

However, each of the first and second SDEs 112 and 118 may also be a ruled grating, a prism, or the like. In some embodiments, the first and second SDEs 112 and 118 may be same or substantially the same elements, but in opposite orientations (i.e., the input of one may be used as an output in the other).

In some embodiments, the spatial light modulator 114 may be a high-speed spatial light modulator (SLM) employing the quantum confined Stark effect (QCSE) in multiple quantum well (MQW) semiconductor heterostructures. Such an implementation is desirable as its high speed allows the spatial light modulator 114 to utilize the large bandwidth available in a free space optical (FSO) WDM system using the fast mode-locked laser 110. The spatial light modulator 114 imposes a spatially varying modulation (e.g., phase and/or amplitude modulation) on each of the spatially distributed light beams 113 (each of which represents a frequency channel) produced by the first SDE 112. Thus, the spatial light modulator 114 may modulate (e.g., encode) the spatially distributed beams 113 according to the input signal 101. Thus, the spatial light modulator 114 encodes quantum information (e.g. various quantum states) into the phase and/or intensity of photons.

The spatial light modulator structure may be based on an array of asymmetric Fabry-Perot (AFP) GaAs/AlGaAs MQW phase modulators (hereinafter referred to as "MQW modulators") operating at a wavelength of, for example, about 850 nm driven by high-speed complementary metal oxide semiconductor (CMOS) drivers (e.g., operating at a frequency higher than 1 GHz) for each MQW modulator. Each of the MQW modulators may independently employ a phase shift to each corresponding wavelength of light, enabling QKD protocols based on differential phase shift keying. In some examples, the MQW modulators and CMOS drivers may be arranged in a linear array, a rectangular array, a circular array, and/or the like. The CMOS drivers may be controlled by suitable microelectronics, such as customized application-specific integrated circuits (ASICs), field-programmable gate arrays (FPGAs), and/or the like, which may interface with a processor (e.g., a personal computer) and a memory storing control instructions (e.g., as part of an application software). However, embodiments of the present invention are not limited to the aforementioned spatial light modulators and any suitable modulator may be used, such as acousto-optic modulators, liquid-crystal-based modulators, and/or the like.

The operating wavelength of the multi-channel FSO WDM system 100 is selected as a value at which the laser source 110 can produce a fast (i.e., an ultrashort) pulse having a high bandwidth (which translates into a large number of channels), and at which the spatial light modulator 114 exhibits a high switching speed, the detector array 124 exhibits fast detection speed and high conversion efficiency, and the free space exhibits low attenuation (e.g., high transparency). According to some embodiments, the operating wavelength of the multi-channel FSO WDM system 100 (i.e., the center wavelength of the laser pulses output from the laser source 110) may be from about 700 nm to about 1 μm. According to some embodiments, the operating wavelength may be about 850 nm. At such an operating wavelength the spatial light modulator 114 (e.g., its constituent MQW modulators) exhibit high modulation phase shifts (e.g., more than π) at low driving voltages (e.g., less than 3 V), which are compatible with CMOS drive electronics. The 850 nm operating wavelength is also consistent with high-speed semiconductor mode-locked lasers and silicon-based single-photon detectors. However, embodiments of the present invention are not limited thereto, and any suitable operating wavelength may be used.

In embodiments in which the multi-channel FSO WDM system 100 utilizes quantum communication protocols based on differential phase shift keying, the spatial light modulator 114 may perform phase modulation. However, embodiments of the present invention are not limited thereto, and in some examples, the spatial light modulator 114 may perform amplitude modulation. In other examples, a coherent state amplitude and phase modulator may be used, which may enable even higher data rates than achievable by phase modulation alone.

In some embodiments, the attenuator 116 is a partially absorbing broadband material, such as partially transmitting glass, or polarization-based attenuator using liquid crystal-based polarization rotators and glass polarizing beamsplitters. However, embodiments of the present invention are not limited thereto, and the multi-channel FSO WDM system 100 may utilize any suitable attenuator 116. According to some embodiments, the attenuator 116 and the second SDE 118 further attenuate and then recombine (e.g., spatially compress) the plurality of dispersed modulated pulses 115 generated by the spatial light modulator 114 to generate the first weak optical signal 103. The attenuation level of the attenuator may depend on the laser power of the laser source 110, any may be selected such that the first weak optical signal 103 emitted from the transmitter 102 includes, on average, from about 0.1 photons per laser pulse to about 100 photons per laser pulse (e.g., less than 1 photon per laser pulse). In an example utilizing about 1000 parallel frequency channels, this may correspond to the first weak optical signal 103 having an average of about 0.0001 to about 0.1 photons per channel, at the output of the transmitter 102. As the free space 104 introduces further attenuation (which may depend on the medium of the free space 104, e.g., vacuum, air, smoke, vapor, and/or the like), the second weak optical signal received at the receiver 106 may exhibit, for example, an average of about 0.001 to about 1 photons per laser pulse (or, in the example of 1000 frequency channels, from about $10^{-6}$ to about $10^{-3}$ photons per channel, on average).

Referring still to FIG. 2, the receiver 106 includes an interferometer 120 for converting the phase information in the second weak optical signal 105 (which was encoded by the spatial light modulator 114) into timing/amplitude information, a third passive spatially dispersive element (e.g., a third SDE) 122 for spatially decompressing the output of the interferometer 120, and a high-speed detector array 124 for resolving the timing/amplitude information in the signal from the third SDE 122 and generating an output signal (e.g., an electrical signal) 107 that can be further processed by an external electronic device.

In some embodiments, the interferometer 120 is an unbalanced Mach-Zender interferometer. In some examples, an input coupler (e.g., a 3-db coupler) 120a of the interferometer 120 splits the second weak optical signal 105 received from free space 104 into a first portion passing through a first arm of the interferometer 120 and a second portion passing through a second arm of the interferometer 120, which may have a longer length than the first arm. The first arm may, for example, be a straight path from the input coupler 120a to the output coupler 120d. The second arm may, for example, utilize two broadband mirrors (such as metal mirrors) 120b and 120c to extend the length the length of light travel and to delay the corresponding second portion of the second weak optical signal 105 by a set or predetermined delay time. In some examples, the delay time may be equal to the time for one laser pulse, that is, 1/pulse rate of the laser source 110. The first and second portions are then recombined by an output coupler (e.g., a 3-db coupler) 120d of the interferometer 120 into a single combined beam 121. Thus, by converting phase information into amplitude/time information (e.g., light intensity), which can be detected by the detector array 124, the interferometer 120 allows the receiver 106 to detect changes in the phase of the second weak optical signal 105.

While the interferometer 120 has been described as an unbalanced Mach-Zender interferometer, embodiments of the present invention are not limited thereto, and any suitable implementation may be utilized in the interferometer 120.

The third SDE 122 spatially disperses the combined beam into a plurality of time and/or amplitude encoded dispersed pulses 123, which are detectable by the detector array 124.

The detector array 124 converts the plurality of time and/or amplitude encoded dispersed pulses, which are optical signals, into the output signal 107, which is an electronic signal, that may be further processed by an external electronic device.

The detector array (e.g., the high-speed detector array) 124 may include one of an array of avalanche photodiodes, an intensified charge-coupled device (CCD), or an array of superconducting nanowire detectors, depending on the operating wavelength and the availability of high-voltage or cryogenic equipment at the receiver 106. While slower than the avalanche photodiodes, the superconducting nanowire detectors offer higher efficiency, which may lead to the preservation of a higher number of channels of the plurality of frequency channels within the encoded dispersed pulses 123.

According to some examples, the multi-channel FSO WDM system 100 may reduce beam divergence through free space 104 by widening the beam transmitted by the transmitter 102. In such examples, the multi-channel FSO WDM system 100 may utilize an optical lens (e.g., a telescopic lens), after the second SDE 118, and may use a similar lens before the receiver 106 to recompress the received beam.

Figure 3:
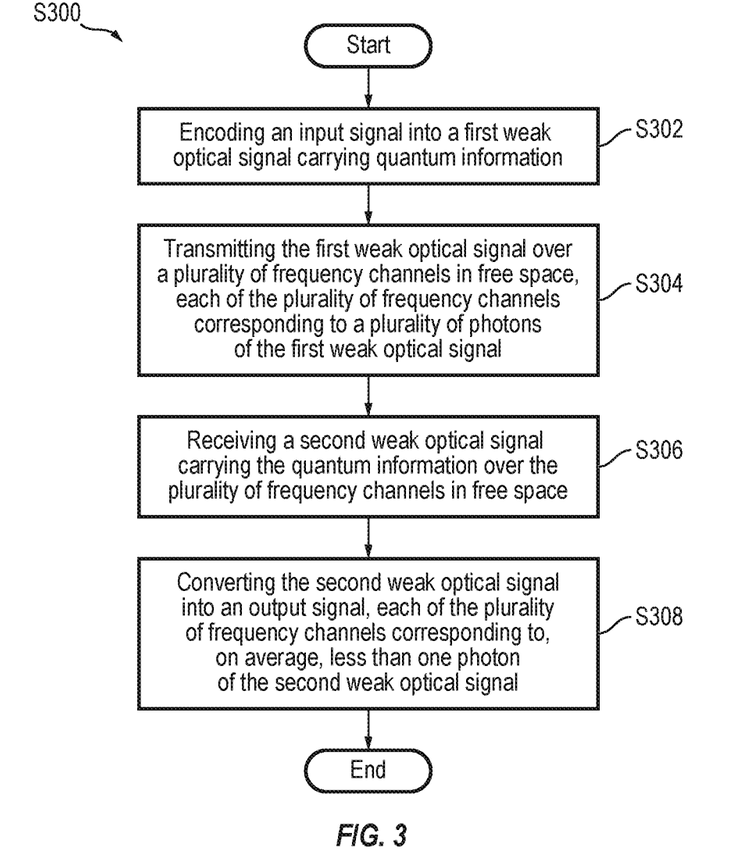
FIG. 3 illustrates a process for enabling quantum communication in the multi-channel FSO WDM system according to some embodiments of the present invention.

FIG. 3 illustrates a process S300 for enabling quantum communication in the multi-channel FSO WDM system 100 according to some embodiments of the present invention.

In act S302, the transmitter 102 encodes an input signal into a first weak optical signal carrying quantum information. In some embodiments, the laser source 110 generates a plurality of mode-locked broadband laser pulses (e.g., a train of mode-locked broadband laser pulses) 111 that are separated in time. The first SDE 112 then spatially disperses the plurality of mode-locked broadband laser pulses 111 into a plurality of dispersed pulses 113. The dispersive spatial light modulator 114 modulates the plurality of dispersed pulses 113 using the input signal 101 to generate a plurality of dispersed modulated pulses 115 using a modulation scheme, which may, for example, be a phase modulation scheme or an amplitude modulation scheme.

In act S304, the transmitter 102 transmits the first weak optical signal over a plurality of frequency channels in free space 104, each of the plurality of frequency channels corresponding to a plurality of photons of the first weak optical signal. In some embodiments, the attenuator 116 attenuates the plurality of dispersed modulated pulses 115 to generate a plurality of dispersed attenuated pulses, and the second SDE 118 spectrally combines (e.g. spectrally compresses) the plurality of dispersed attenuated pulses to generate the first weak optical signal transmitted through free space over the plurality of frequency channels.

In act S306, the receiver 106 receives a second weak optical signal carrying the quantum information over the plurality of frequency channels in free space, and in act S308, the receiver 106 converts the second weak optical signal into an output signal, each of the plurality of frequency channels corresponding to, on average, less than one photon of the first weak optical signal 103, and an even smaller number of photons of the second weak optical signal 105. In some embodiments, the interferometer 120 receives the second weak optical signal 105 and generates a combined beam 121 including time and/or amplitude encoded information corresponding to phase-encoded information within the second weak optical signal. The third SDE 122 then spatially disperses the combined beam 121 into a plurality of time and/or amplitude encoded dispersed pulses 123, which are converted into the output signal 107 using the a detector array 124.

Accordingly, embodiments of the present invention provide a compact, single-source of many parallel quantum channels to improve the rate of QKD and similar quantum communication protocols. Because the multi-channel FSO WDM system employs many parallel frequency/wavelength channels, it may generate quantum-measurement-based bit strings faster than single-channel quantum communication systems. Because a single mode-locked laser is employed, the multi-channel FSO WDM system may be more compact, power-efficient, and inexpensive than an array of multiple sources and detectors. The multi-channel FSO WDM system, according to embodiments of the present invention, may also use a smaller optical beam waist than strictly spatially parallel systems since embodiments of the present invention use multiple frequency/wavelength channels.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

It will be understood that, although the terms "first," "second," "third," etc., may be used herein to describe various elements, components, and/or sections, these elements, components, and/or sections should not be limited by these terms. These terms are used to distinguish one element, component, or section from another element, component, or section. Thus, a first element, component, or section discussed above could be termed a second element, component, or section, without departing from the spirit and scope of the invention.

It will be understood that the spatially relative terms used herein are intended to encompass different orientations of the device in use or in operation, in addition to the orientation depicted in the figures. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the invention. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the invention refers to "one or more embodiments of the invention." Also, the term "exemplary" is intended to refer to an example or illustration.

It will be understood that when an element or component is referred to as being "connected to" or "coupled to" another element or component, it can be directly connected to or coupled to the other element or component, or one or more intervening elements or components may be present. When an element or layer is referred to as being "directly connected to" or "directly coupled to" another element or component, there are no intervening elements or components present.

As used herein, the terms "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. §112, first paragraph, and 35 U.S.C. §132(a).

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that suitable alterations and changes in the described structures and methods can be practiced without meaningfully departing from the principles, spirit, and scope of this invention, as set forth in the following claims and equivalents thereof.

What is claimed is:

1. A multi-channel free-space optical (FSO) wavelength division multiplexing (WDM) system for optical quantum communication, the system comprising:

a transmitter configured to encode an input signal into a weak optical signal carrying quantum information, and to transmit the weak optical signal over a plurality of frequency channels in free space, each of the plurality of frequency channels corresponding to a plurality of photons of the weak optical signal; and a receiver configured to receive and decode the weak optical signal, wherein the receiver is configured to convert the received weak optical signal into an output signal, each of the plurality of frequency channels corresponding to, on average, less than one photon of the weak optical signal at an output of the transmitter, and an even smaller number of photons of the received weak optical signal at an input of the receiver.

2. The multi-channel FSO WDM system of claim 1, wherein the weak optical signal carries the quantum information over the plurality of frequency channels.

3. A multi-channel free-space optical (FSO) wavelength division multiplexing (WDM) system for optical quantum communication, the system comprising:

a transmitter configured to encode an input signal into a weak optical signal carrying quantum information, and to transmit the weak optical signal over a plurality of frequency channels in free space, each of the plurality of frequency channels corresponding to a plurality of photons of the weak optical signal; and a receiver configured to receive and decode the weak optical signal, wherein the transmitter is configured to generate the weak optical signal using a single laser source.

4. The multi-channel FSO WDM system of claim 1, wherein the input signal is a quantum key or an encoded data signal embedded with the quantum key, and wherein the plurality of frequency channels represent a plurality of parallel quantum channels.

5. The multi-channel FSO WDM system of claim 1, wherein the transmitter is configured to encode the input signal in a phase of the weak optical signal.

6. The multi-channel FSO WDM system of claim 1, wherein there is no physical connection between the transmitter and the receiver.

7. A transmitter for a multi-channel FSO WDM system comprising:

a laser source configured to generate a plurality of mode-locked broadband laser pulses separated in time;

a first passive spatially dispersive element configured to spatially disperse the plurality of mode-locked broadband laser pulses into a plurality of dispersed pulses;

a dispersive spatial light modulator configured to modulate the plurality of dispersed pulses using an input signal to generate a plurality of dispersed modulated pulses using a modulation scheme;

an attenuator configured to attenuate the plurality of dispersed modulated pulses to generate a plurality of dispersed attenuated pulses; and a second passive spatially dispersive element configured to spectrally combine the plurality of dispersed attenuated pulses to generate a weak optical signal transmitted through free space over a plurality of frequency channels.

8. The transmitter of claim 7, wherein the weak optical signal carries quantum information, and wherein the transmitter is configured to transmit the weak optical signal over a plurality of frequency channels in free space to a receiver configured to receive and decode the weak optical signal, and wherein the receiver is configured to convert the received weak optical signal into an output signal, each of the plurality of frequency channels corresponding to, on average, less than one photon of the weak optical signal at an output of the transmitter, and a smaller number of photons of the received weak optical signal at an input of the receiver.

9. The transmitter of claim 7, wherein the laser source is a mode-locked laser based on a semiconductor heterostructure with saturable absorber, a fiber system, or a solid-state crystal and an acousto-optic modulator.

10. The transmitter of claim 7, wherein each of the first and second passive spatially dispersive elements comprise a holographic grating, a ruled grating, or a prism, and wherein the second passive spatially dispersive element is an inverse of the first passive spatially dispersive element.

11. The transmitter of claim 7, wherein the modulation scheme comprises a phase modulation scheme or an amplitude modulation scheme.

12. A receiver for a multi-channel FSO WDM system comprising:

an unbalanced mach-zender interferometer configured to receive a weak optical signal and to generate a combined beam including time and/or amplitude encoded information corresponding to phase-encoded information within the weak optical signal;

a passive spatially dispersive element configured to spatially disperse the combined beam into a plurality of time and/or amplitude encoded dispersed pulses; and a detector array configured to convert the plurality of time and/or amplitude encoded dispersed pulses into an output signal, the output signal being an electronic signal.

13. The receiver of claim 12, wherein the unbalanced mach-zender interferometer comprises:

an input coupler configured to split the weak optical signal into a first portion passing through a first arm and a second portion passing through a second arm, the second arm having a longer length than the first arm;

a broadband mirror configured to delay the second portion relative to the first portion; and an output coupler configured to combine the first and second portions to generate the combined beam.

14. The receiver of claim 12, wherein the detector array comprises avalanche photodiodes, an intensified charge-coupled device, or an array of superconducting nanowire detectors.

15. The receiver of claim 12, wherein the receiver is configured to receive the weak optical signal from a transmitter over a plurality of frequency channels in free space, the transmitter being configured to encode an input signal representing quantum information into the weak optical signal, and wherein each of the plurality of frequency channels corresponds to, on average, less than one photon of the weak optical signal at an output of the transmitter, and a smaller number of photons of the received weak optical signal at an input of the receiver.

16. The receiver of claim 15, wherein the receiver is configured to resolve a relative phase of photon pulses over the plurality of frequency channels.

17. A method for enabling quantum communication in a multi-channel free-space (FSO) wavelength division multiplexing (WDM) system, the method comprising:

encoding, via a transmitter, an input signal into a first weak optical signal carrying quantum information;

transmitting, via the transmitter, the first weak optical signal over a plurality of frequency channels in free space, each of the plurality of frequency channels corresponding to a plurality of photons of the first weak optical signal;

receiving, via a receiver, a second weak optical signal corresponding to the first weak optical signal and carrying the quantum information over the plurality of frequency channels in free space; and converting, via the receiver, the second weak optical signal into an output signal, each of the plurality of frequency channels corresponding to, on average, less than one photon of the first weak optical signal, and a smaller number of photons of the second weak optical signal.

18. The method of claim 17, wherein the receiving and converting comprise:

generating, via a laser source, a plurality of mode-locked broadband laser pulses separated in time;

spatially dispersing, via a first passive spatially dispersive element, the plurality of mode-locked broadband laser pulses into a plurality of dispersed pulses;

modulating, via a dispersive spatial light modulator, the plurality of dispersed pulses using the input signal to generate a plurality of dispersed modulated pulses using a modulation scheme;

attenuating, via an attenuator, the plurality of dispersed modulated pulses to generate a plurality of dispersed attenuated pulses; and spectrally combining, via a second passive spatially dispersive element, the plurality of dispersed attenuated pulses to generate the first weak optical signal transmitted through free space over the plurality of frequency channels.

19. The method of claim 17, wherein the receiving and converting comprise:

receiving, via an unbalanced mach-zender interferometer, the second weak optical signal;

generating, via an unbalanced mach-zender interferometer, a combined beam including time and/or amplitude encoded information corresponding to phase-encoded information within the second weak optical signal;

spatially dispersing, via a third passive spatially dispersive element, the combined beam into a plurality of time and/or amplitude encoded dispersed pulses; and converting, via a detector array, the plurality of time and/or amplitude encoded dispersed pulses into the output signal, the output signal being an electronic signal.

20. The method of claim 17, wherein the input signal is a quantum key or an encoded data signal embedded with the quantum key.

* * * * *